March 2, 1937.  O. VON BRONK  2,072,658

RECEIVER ARRANGEMENT FOR ELECTRIC PICTURE TRANSMISSION

Filed March 7, 1931

INVENTOR
OTTO VON BRONK
BY
ATTORNEY

Patented Mar. 2, 1937

2,072,658

UNITED STATES PATENT OFFICE 2,072,658

RECEIVER ARRANGEMENT FOR ELECTRIC PICTURE TRANSMISSION

Otto von Bronk, Berlin, Germany, assignor to Telefunken Gesellschaft für Drahtlose Telegraphie m. b. H., Berlin, Germany, a corporation of Germany Application March 7, 1931, Serial No. 520,829
In Germany March 15, 1930

9 Claims. (Cl. 178—6)

The present invention is concerned with developments of the method for electric picture telegraphy and has as one of its objects and advantages that of improving upon the system disclosed in German Patent #450,454. According to the latter, scanning or re-creation of the picture is effected by the aid of a light control grate which is built up of individual layers which are subjected in time-sequence to control by electrical potentials. For this purpose, according to the above mentioned patent, polarized light is employed which is varied by the aid of the Kerr effect.

The present invention consists in that the grate arrangement with a stratified effect and built up of constituent electrodes is utilized for the control of the cathode rays of a Braun tube.

One embodiment of the invention is illustrated by way of example in the drawing, wherein:

Fig. 1 discloses a receiving system embodying the use of a cathode ray tube in accordance with my invention;

Figure 1:
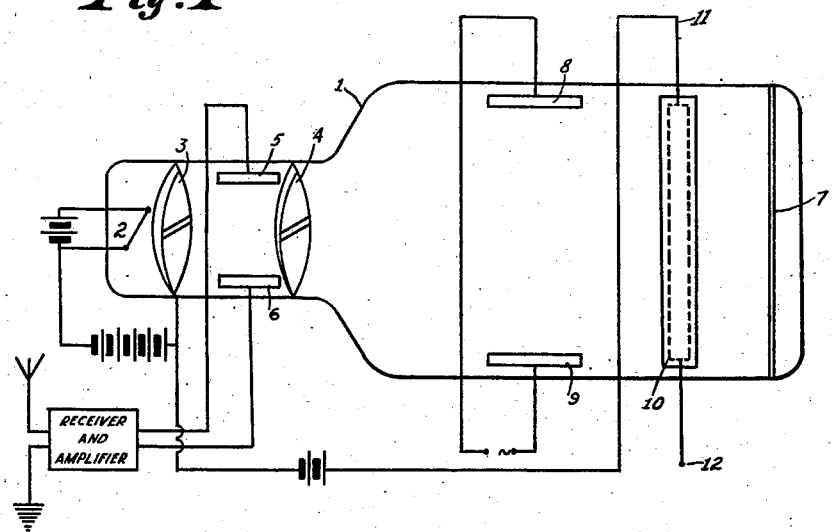

Referring to Fig. 1, I denotes the Braun tube having a cathode member 2 which is preferably of the Wehnelt heated type. A slit diaphragm 3 is arranged close to the cathode so that the diaphragm may serve at the same time as an anode. Through the slit anode 3 the cathode rays generated by the heated cathode 2 may pass through an additional slit diaphragm 4 which is arranged parallel to diaphragm 3. Suitable deflector plates 5 and 6, to which a potential difference may be applied, are provided for the purpose of setting up a field at right angles to the direction of the slit diaphragm and the radiation. The fluorescent screen 7 is located at the end of the tube I opposite the cathode 2 and upon this screen a luminous stripe or streak is produced by the cathode rays passing from the heated cathode 2 through the diaphragms 3 and 4.

The light modulation produced by the photoelectric cell of a suitably arranged transmitter is insured by the deflector plates 5 and 6, adjustment being effected in such a way that normally the cathode ray pencil passing from the heated cathode through diaphragm 3 will not penetrate through the diaphragm 4. Owing to the deflecting action exercised by the plates 5 and 6 subject to the control of the photoelectric cell currents, the deflected pencil of cathode rays will penetrate more or less through the slit 4. The ray pencil passing through the diaphragm 4 is therefore controlled in its intensity in accordance with the modulation currents of the photoelectric cell.

For the generation of one picture component, the deflector plates 8 and 9 are furnished with alternating current potentials in such a way that the luminous stripe produced upon the fluorescent screen is moved up and down in accordance with the line-by-line scanning of the picture at the sending end.

Figure 2:
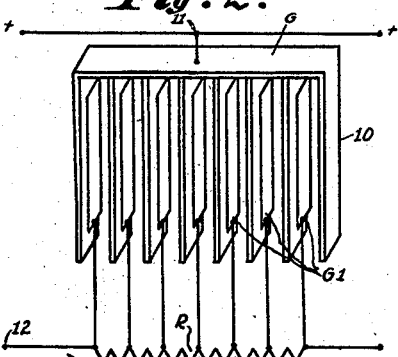
Fig. 2 is a showing of the grid control element used in the arrangement of Fig. 1.

Between the deflector plates 8 and 9 which cause the upward and downward motion of the fluorescent stripe, and the fluorescent screen 7 is a control grid 10 of stratum-like action. The effect of the grid will be explained and best understood by referring more particularly to Fig. 2 where G denotes a comb-like grid or grate formed by parallel connected plate electrodes and which by means of connection at 11 to an auxiliary current-source is maintained at a constant and, for example, positive potential. The constituent plates of the grid are at right angles to the direction of the slit diaphragms 3 and 4. Between the plates is a grid arrangement G' built up of a plurality of electrodes which are charged, for instance, negatively by connection at 12 to an appropriate source. Hence, normally, the luminous stripe will not reach the fluorescent screen disposed in the rear of the grid G since the electrons are deviated so as to strike the plates of the grid G. If, on the contrary, one of the different electrodes of the grid G' is raised to the same potential as the comb grid G, then at the particular place between the electrode in question and the neighboring electrodes of the grid G a space free from field is created so that the electron pencil issuing from the heated cathode and being of linear cross-section is able to reach the screen only therethrough with the result that at that part a luminescent point is produced. The influence upon grid G' occurring in time-sequence is accomplished in a way known from the above referred to patent by the connection of a resistance R, the separate portions of which are designated by letters a, b, c, d, e, f. It is obvious that the strip-shaped cathode ray pencils are resolved or broken up into a great number of constituent squares corresponding to the size of the inter-plate distance of the grid G.

Figure 3:
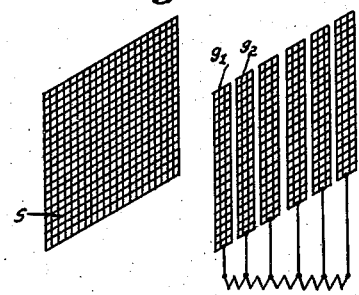
Fig. 3 is a modification of the grid control element shown by Fig. 2.

Instead of two comb-shaped inter-engaging grids G' and G by which the cathode ray pencil is deflected in transverse direction, it is also feasible to have recourse to two grids as shown by Fig. 3. Referring to this illustration, S denotes a grid electrode which is kept at a constant potential, preferably the plate potential. Between the electrode S and the fluorescent screen are disposed a plurality of strip-shaped grid electrodes $g_1$, $g_2$, positioned perpendicularly (at right angles) to the slit diaphragms, said electrodes normally being at a negative potential with reference to the electrode S, and the width of which roughly corresponds to the breadth of a picture point or unit. One of the strip-shaped electrodes is successively supplied with a positive potential so that the line-shaped electron ray pencil is capable of passing only through the respective strip grid to result in a punctiform spot upon the fluorescent screen.

Instead of the resistances illustrated in the drawing, it would also be feasible to use other alternating current resistances or reactances such as condensers or inductance coils, and these could be accommodated inside the vacuous vessel.

Generally speaking, it will be found preferable to produce the slow component of the picture decomposition or scanning by the deflector plates 8, 9, and the scanning of the fast component by the stratified grid 10.

However, it is possible also to proceed along the contrary line so that the scanning of the fast component is effected by the deflector plates 8, 9. In that instance it is feasible to employ a slit diaphragm with substantially radial slits and caused to rotate in the rear of the Braun tube, instead of using the stratified grid 10. In this manner higher numbers of picture units are attained than has heretofore been possible.

Figure 4:
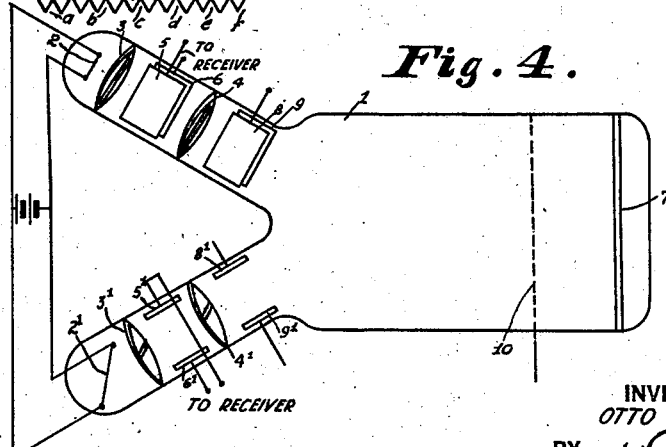
Fig. 4 is a modification of the arrangement shown by Fig. 1 and discloses a receiving system wherein two separate cathode ray streams suitably controlled are utilized for reproducing an image of an object which is viewed at a suitable transmitting station.

Fig. 4 shows a further embodiment of the invention. The Braun tube 1 is equipped with two heated cathodes 2 and 2'. In this modification of the invention, 3, 4, and 3', 4' represent the slit diaphragms described in connection with Fig. 1. The plates 5, 6, and 5', 6' are the modulation and deflector plates. The slit diaphragms 3 and 4 are positioned at right angles to the slit diaphragms 3' and 4'. The same right angle position in relation to each other is maintained for the modulation and deflector plates 5 and 6 with reference to plates 5' and 6'. The plates 8 and 9, as well as the plates 8' and 9', are additional deflector plates adapted to deviate the cathode ray pencils issuing from the two hot cathodes 2 and 2' in a horizontal and in a vertical direction respectively.

With this arrangement, a luminous cross would normally be produced upon the fluorescent screen 7, and the intersection point of this cross would have greater brightness. By the deflection of the two cathode rays it is possible to cause the brighter intersection point thereof, for re-creation of the picture to be transmitted, to travel across the picture surface. With this end in view it is necessary to cause one of the rays to reciprocate at a correspondingly higher rate of speed across the picture surface than the other ray pencil. The threshold value of response of the fluorescent screen may be so adjusted that neither of the two rays separately or singly will be able to result in luminescence. Thus a square luminous spot will be produced only upon the combination of both rays. For regulation of the radiation it may be suitable to use also a distinct grid 10' between the screen and the heated cathodes. Also, in that case the two rays are given such an intensity that the energy of each of the two rays just falls below the threshold value of the luminescent screen 7.

In the embodiment shown in Fig. 4, both ray paths are modulated by photoelectric cell currents. It may be preferable to modulate only one of the two ray pencils, it being then necessary to modulate the ray having the greater velocity of motion.

Other modifications and changes may suggest themselves to those skilled in the art to which the invention relates, and I, therefore, believe myself to be entitled to make and use any and all of such modifications as fall fairly within the spirit and scope of the hereinafter appended claims.

Having now described my invention, what I claim and desire to secure by Letters Patent is the following:

1. In a system for receiving television images, a Braun tube having an electron emitter and a screen adapted to become fluorescent upon the electron stream reaching the screen, means included in said tube for controlling the position of said electron stream in one direction transverse to said tube, and a comb-like grid formed from a series of sections and means for sequentially rendering the several sections of the grid operative to pass said electron stream in a direction transverse to said first named control direction for limiting the effect of said electron stream upon said fluorescent screen to elemental sections of the screen at any instant.

2. In a television receiving device, a plurality of elongated electron emitting sources arranged in angular relationship with respect to each other each of said emitting sources producing an electron beam of elemental width and appreciable length, means for deflecting each of said electron streams along a path transverse to the path of the other, and a screen positioned in the path of both of said electron streams and adapted to become fluorescent at areas corresponding to the areas at which said electron streams intersect and reach said screen simultaneously.

3. A system for reproducing television images which comprises a cathode ray device having an elongated electron emitter for emitting a pencil-like electron stream, a fluorescent screen adapted to become luminescent upon bombardment thereof by said electron stream, a control screen interposed between said source of electrons and said fluorescent screen through which said electrons pass to said fluorescent screen, and means for sequentially controlling the potential of successive elements on said control screen for rendering said screen operative to pass only a small section of said electron stream at any instant.

4. In a system for receiving television images, a Braun tube having an elongated cathode emitter for emitting an elongated electron stream, a fluorescent screen arranged within said tube and adapted to become luminescent upon the bombardment thereof by said electron stream, electrostatic means for deflecting said elongated electron stream in one direction transverse to said tube, a sectional grid extending transverse to said tube in an angular direction with respect to the electrostatic field for controlling the position of said electron stream in said first direction, means for normally maintaining said grid inoperative to pass said electron stream to said fluorescent screen, and means for sequentially rendering elemental sections of said grid operative to pass elemental sections of said electron stream for controlling the position of said electron stream in an angular direction with respect to said first named electrostatic control.

5. In a device for producing electro-optical images of subjects located at a distant point, a cathode ray device for producing an elongated electron stream of elemental width for re-creating an image, means for receiving signals from the distant point corresponding to varying intensities of light and shadow on the object of which an image is to be produced, means for controlling in accordance with the received signals the effective intensity of the generated electron stream, electrostatic means for controlling the position of the elongated electron stream for re-creating the picture in one direction, and a multi-section control grid element through which the electron stream passes for limiting the portion of the elongated electron stream effective upon the screen so as to control the trace of the fluorescent effect in a point for point manner in a second direction.

6. In a television receiving device, a plurality of elongated electron sources each producing along transverse paths elongated electron streams each of elemental width, means for controlling the position of each of the said elongated electron streams along planes transverse to each other, and a screen positioned in the path of said both electron streams and adapted to become fluorescent only at elemental areas corresponding to the elemental areas at which both of said electron streams intersect and reach said screen simultaneously, said area of fluorescence corresponding to an area of elemental length of each of said elemental width electron streams.

7. In a cathode ray television system, a cathode ray tube including fluorescent screen structure, an elongated electron emitter for emitting an electron stream extending transversely of the tube for a distance substantially corresponding to one dimension of the screen area so that the screen is normally adapted to become luminescent upon the bombardment thereof by said cathode rays over an area of elemental width and of length corresponding substantially to one dimension thereof, and means to limit the portion of said linear electron stream actually effective upon the screen instantaneously solely to areas of elemental length and width.

8. In a cathode ray television system, screen structure adapted to fluoresce under electronic bombardment, a source of electrons adapted in an uncontrolled state to produce elemental width strips of light from the fluorescent screen, and a controlling element positioned intermediate the electron source and the screen to limit sequentially the fluorescent effects instantaneously produced by the electron stream upon the said screen to elemental lengths of the elemental width electron stream.

9. The method of controlling the intensity of illumination observable upon the fluorescent end wall of a cathode ray device which comprises developing an electron beam of appreciable length measured transversely to the tube axis and of elemental width so as normally to produce the simultaneous illumination of a rectangular area of elemental width on the tube fluorescent end wall, and producing under the control of received image signals electrical forces to repel predetermined elemental sections of the developed electron beam and confine thereby the observable effects to elemental screen areas coordinated with the light distribution upon elemental areas of a subject of which the image is desired.

OTTO VON BRONK.